March 23, 1926.  1,577,708
E. W. GALLENKAMP
SECTIONAL JOINT
Filed Oct. 6, 1923
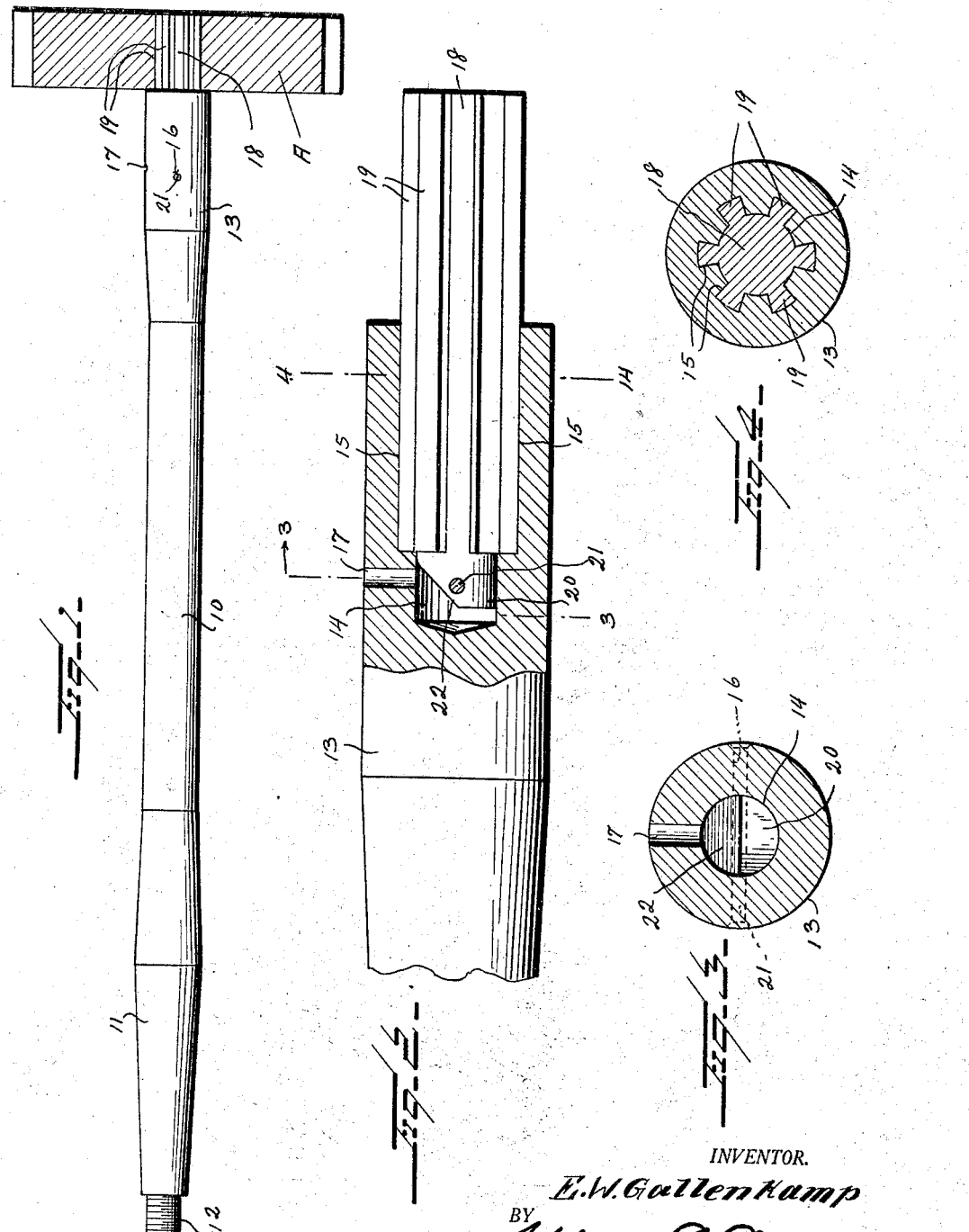
INVENTOR.
E. W. Gallenkamp
BY Watson E. Coleman
ATTORNEY.

Patented Mar. 23, 1926.

1,577,708

UNITED STATES PATENT OFFICE.

ERNEST W. GALLENKAMP, OF CONNERSVILLE, INDIANA.

SECTIONAL JOINT.

Application filed October 6, 1923. Serial No. 666,953.

*To all whom it may concern:*

Be it known that I, ERNEST W. GALLENKAMP, a citizen of the United States, residing at Connersville, in the county of Fayette and State of Indiana, have invented certain new and useful Improvements in Sectional Joints, of which the following is a specification, reference being had to the accompanying drawings.

This invention relates to axles, particularly those designed for use in the rear construction of motor vehicles, and has for its object the provision of an axle having a detachable stub whereby repairing or replacement may be easily effected even by the roadside and without necessitating discarding the entire axle.

It is well-known that the back or driving axles of a motor vehicle frequently twist off and the breakage generally occurs at or near the connection of the axle with the gear thereon, this being the point of greatest strain. Ordinarily it is necessary to take down considerable of the rear construction in order to make the necessary replacement and in the use of the ordinary or well-known axle the entire member must be discarded. It is with these facts in view that I have designed the present invention which overcomes the objectionable features above mentioned and which has the further advantage of permitting a small spare part to be carried, which part may be used in connection with the axle at either side of the vehicle, interchangeability being one of the features.

Still another object is the provision of an axle of this character in which the detachable or removable stub is peculiarly formed whereby it may be driven out in case it sticks in its socket as the result of twisting.

An additional object is the provision of a device of this character which will be simple and inexpensive to manufacture, easy to use, efficient and durable in service and a general improvement in the art.

With the above and other objects and advantages in view, the invention consists in the details of construction and arrangement of parts to be hereinafter more fully described and claimed, and illustrated in the accompanying drawings in which:—

Figure 1 is a side elevation of an axle constructed in accordance with my invention;

Figure 2 is a longitudinal section through the end thereof equipped with the removable stub;

Figure 3 is a cross section on the line 3—3 of Figure 2; and

Figure 4 is a cross section on the line 4—4 of Figure 2.

Referring more particularly to the drawings I have shown the axle as comprising the usual elongated body 10 which has one end somewhat enlarged and tapered, as indicated at 11 and terminating in a reduced threaded extension 12. The tapered portion 11 is designed to have the wheel jammed thereon and held by a suitable nut screwed on to the extension 12, there being nothing peculiar about this end of the device. The opposite end 13 is slightly enlarged and finished in the usual manner but instead of carrying a rigid integral stub it is provided with the detachable stub to be described.

In the carrying out of the invention the end 13 of the axle body is formed with a socket 14 of a cross sectional configuration corresponding to the stub necessary to be used in the drive mechanism of the particular make of vehicle, there being absolutely no limitations in this respect though for the sake of illustration I have shown the socket as having its wall formed with a series of grooves 15. It is to be understood that grooving is not necessary as a plurality of facets would operate in the same manner.

In the actual building or making of the axle it is preferable that prior to finishing, the end 13 be drilled with a central hole of comparatively small diameter and that it be heated so as to permit the formation of the socket 14 in an upsetting machine of suitable type. As it is quite possible that the socket might not be truly centered, it is intended that the axle be placed in a lathe or other turning machine using the inside end of the socket as a center so that the end portion 13 may be properly trued and finished. I also provide a small hole 16 which is drilled diametrically through the axle at a point to intersect the inner end of the socket and at substantially right angles to this hole a hole 17 of larger size is drilled for a purpose to be described.

Removably engaged within the socket 14 is the detachable stub 18 which has its splines 19 engaging conformingly within the grooves 15. At its inner end this stub is formed with a reduced extension 20 fitting within the ungrooved portion of the socket, and this extension is formed with a transverse hole registering with the hole 16 for the passage of a securing pin 21 provided for the purpose of preventing the stub from remaining in the drive gear when occasion is had to extract the axle. It is, of course intended that the stub 19 be engaged within the usual opening in the associated drive gear A. The extremity of the extension 20 is formed with an inclined face 22 opposite the hole 17.

The axle is assembled in the vehicle drive mechanism in exactly the same manner as the ordinary axle but it is obvious that in case of breakage it is a simple matter to remove the axle from its housing, the stub 19 pulling out of the gear owing to the provision of the pin 21 which prevents separation of the main body and the stub. When removing the stub after the axle is withdrawn from the car, the pin 21 must be removed and ordinarily the stub will not stick within its socket. If by any chance the stub has been twisted to such an extent that its removal is difficult it is merely necessary to insert a punch, drift or other equivalent implement through the hole 17 and into engagement with the inclined end 22 of the extension 20 and then apply a few blows with a hammer or the like to such implement to force out the stub.

From the foregoing description and a study of the drawings it will be apparent that I have thus provided an axle construction for use in semi-floating or full-floating motor vehicle rear end construction in which replacement of a part may be made in case of a break, it being unnecessary to discard the entire axle. The use of this device obviates all of the objections incident to the use of the ordinary one-piece axle as it economizes on parts and labor as well as time when replacement is necessary. Another distinct feature of advantage is that the gear A bears snugly against the end of the axle proper, thus making it practically impossible to twist, and making the use of a smaller stub possible.

While I have shown and described the preferred embodiment of the invention, it is to be understood that I reserve the right to make such changes in the form, construction and arrangement of parts as will not depart from the spirit of the invention or the scope of the subjoined claims.

I claim:—

1. In a vehicle axle, a main body formed at its end with an axial socket and having a plurality of grooves in the wall thereof, said grooves terminating at a point short of the bottom of the socket, the body having a transverse hole leading into the ungrooved portion of the socket, a ribbed stub engaged within the grooved portion of the socket and having a reduced smooth extension fitting within the ungrooved portion of the socket, the extension having a beveled face opposite said transverse hole, and a removable pin extending transversely through the body and the extension at right angles to said hole and serving to prevent longitudinal movement of the stub, said hole serving to permit the insertion of a punch adapted to be engaged with said beveled face for driving out the stub.

2. A vehicle axle comprising a body formed at one end with a socket having its inner portion of reduced diameter, a stub detachably engaged within the socket and having a reduced extension fitting within the reduced portion of the socket, a transverse pin passing through the body and said reduced extension, the end of the extension being beveled, and the body being formed in one side with a hole leading into the reduced portion of the socket at a point opposite the beveled end of the extension to permit the insertion of a drifting tool for forcing the stub out of the socket.

3. A vehicle axle comprising a body formed at one end with an axial splined socket, a splined stub engaged in the socket and having its inner end beveled and a transverse pin passing through the body and said stub, the body being formed in one side with an opening leading into the socket at a point opposite the beveled end of the stub.

In testimony whereof I hereunto affix my signature.

ERNEST W. GALLENKAMP.